(12) United States Patent (10) Patent No.: US 8,714,205 B2
Loebinger et al. (45) Date of Patent: May 6, 2014

(54) DELAYED DEGRADABILITY DRIP IRRIGATION PIPE

(75) Inventors: Ahai Loebinger, Kibbutz Naan (IL); Moshe Gorny, Kibbutz Naan (IL)

(73) Assignee: Naandan Jain Irrigation C.S. Ltd., Kibbutz Naan (IL)

( * ) Notice: Subject to any disclaimer, the term of this patent is extended or adjusted under 35 U.S.C. 154(b) by 882 days.

(21) Appl. No.: 12/899,138

(22) Filed: Oct. 6, 2010

(65) Prior Publication Data

US 2012/0085455 A1 Apr. 12, 2012

(51) Int. Cl.
*F16L 11/00* (2006.01)

(52) U.S. Cl.
USPC ........... 138/137; 138/140; 138/145; 239/542; 239/547

(58) Field of Classification Search
USPC ........... 138/177, 178, 140, 145; 239/542, 547
See application file for complete search history.

(56) References Cited

U.S. PATENT DOCUMENTS

| | | | | |
|---|---|---|---|---|
| 4,474,330 | A * | 10/1984 | Langa | 239/450 |
| 4,541,569 | A * | 9/1985 | Langa | 239/450 |
| 5,332,160 | A | 7/1994 | Ruskin | |
| 5,816,742 | A | 10/1998 | Cordewener | |
| 7,862,873 | B2 * | 1/2011 | Yankovitz et al. | 428/36.91 |
| 2007/0243350 | A1 | 10/2007 | Forsberg et al. | |
| 2008/0072480 | A1 | 3/2008 | McGrady et al. | |
| 2008/0191464 | A1 | 8/2008 | Yankovitz et al. | |
| 2009/0224078 | A1 | 9/2009 | Anderson | |
| 2010/0325952 | A1 * | 12/2010 | Young et al. | 47/81 |

OTHER PUBLICATIONS

International Search Report and Written Opinion dated May 1, 2012 issued during prosecution of PCT/IL11/00778.
CIBA® IRAGUARD® B-1000, B-5000 or B-7000, Apr. 5, 2010.
HYGATE® 4000 or 9000, Apr. 5, 2010.
ALPHASAN®, Apr. 5, 2010.
A. L Prometto, et al., Production of an extracellular polyethylene degrading enzyme(s) by *Streptomyces* species, Appl Environ Microbiol. Feb. 1992 58(2): 731-733—an abstract.
Kenneth E. Johnson, et al., "Degradation of Degradable Starch-Polyethylene Plastics in a Compost Environment", Appl Environ Microbiol. Apr. 1993; 59(4): 1155-1161—an abstract.
G. Farrow, et al., "The degradation of polyethylene terephthalate by methylamine a study by infra-red and X-ray methods", Available online Apr. 22, 2003—an abstract.
Anna Jansson, et al., "Chemical degradation of a polypropylene material exposed to simulated recycling", Available online May 6, 2004—an abstract.
S Teotia, et al., "Magnetite-Alginate Beads for Purification of Some Starch Degrading E Molecular Biotechnology", Mar. 2002, vol. 20, No. 3, pp. 231-238(8)—an abstract.

(Continued)

*Primary Examiner* — Patrick F Brinson
(74) *Attorney, Agent, or Firm* — Sughrue Mion, PLLC

(57) ABSTRACT

A delayed degradability drip irrigation pipe including a water conduit at a water conduit pressure and a plurality of drip irrigation outlets, each communicating with the water conduit and providing a water output at a pressure below the water conduit pressure, at least the water conduit being formed at least partially of a degradable material and also including a degradability delayer which provides a desired delay prior to failure of the water conduit but permits eventual degradation of the degradable material under predetermined conditions.

4 Claims, 6 Drawing Sheets

(56) References Cited

OTHER PUBLICATIONS

Nalan-ITU Pty Ltd, "Biodegradable Plastics—Developments and Environmental Impacts", Oct. 2002, pp. 1-8.

Benjamin J. McCoy, et al., "Fundamental Kinetics of Supercritical Coal Liquefaction: Effect of Catalysts and Hydrogen-Donor Solvents"—an abstract. Department of Chemical Engineering and Materials Science, University of CA. Period of performance: Aug. 1994 to Jul. 1998.

Book 1: Chapter 5—Environmental Effects, Bulletin: PP9000, Sep. 2003, pp. 25-35.

Andersson U, Ifwarson M, Results and Experiences from Tests on PEX, PEM, PP and PVC Pipes Exposed to Different Chemicals, Proc. of Plastics pipes X Conference, Goteburg, Oct. 1998, pp. 611-620.

* cited by examiner

DELAYED DEGRADABILITY DRIP IRRIGATION PIPE

FIELD OF THE INVENTION

The present invention relates to drip irrigation and more particularly to drip irrigation pipes which are biodegradable in situ.

BACKGROUND OF THE INVENTION

The following patent publications are believed to represent the current state of the art:
U.S. Pat. No. 4,474,330;
U.S. Patent Publications 2008/0191464 and 2008/0072480.

SUMMARY OF THE INVENTION

The present invention seeks to provide drip irrigation pipes having desired biodegradable characteristics.

There is thus provided in accordance with a preferred embodiment of the present invention a delayed degradability drip irrigation pipe including a water conduit at a water conduit pressure and a plurality of drip irrigation outlets, each communicating with the water conduit and providing a water output at a pressure below the water conduit pressure, at least the water conduit being formed at least partially of a degradable material and also including a degradability delayer which provides a desired delay prior to failure of the water conduit but permits eventual degradation of the degradable material under predetermined conditions.

In accordance with a preferred embodiment of the present invention, the degradable material includes biodegradable material.

Preferably, the degradability delayer includes a bacterial growth delayer.

In accordance with a preferred embodiment of the present invention, the degradability delayer includes a generally non-biodegradable material which is mixed with the biodegradable material.

In accordance with a preferred embodiment of the present invention, the degradability delayer is mixed with the biodegradable material.

Preferably, the degradability delayer is formed as a co-extruded layer alongside the biodegradable material. Additionally, the degradability delayer is formed as a co-extruded inner layer of the drip irrigation pipe. Alternatively or additionally, the degradability delayer is formed as a co-extruded outer layer of the drip irrigation pipe.

In accordance with a preferred embodiment of the present invention the degradability delayer is formed as strips along the length of the drip irrigation pipe.

In accordance with a preferred embodiment of the present invention the water conduit includes at least one first layer formed of a biodegradable material, the biodegradable material being mixed with a biodegradability delayer and at least one second layer formed of a non-biodegradable, UV degradable material. Additionally, the at least one second layer also includes an oxo-biodegradable material.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
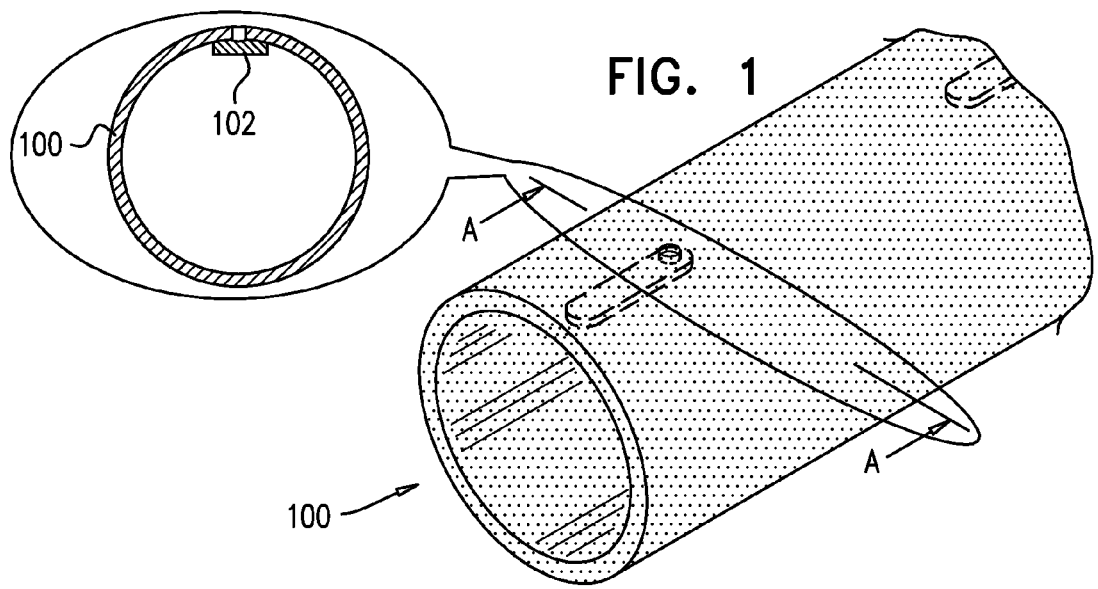
FIG. 1 is a simplified illustration of part of a delayed degradability drip irrigation pipe constructed and operative in accordance with a preferred embodiment of the present invention.
Figure 2:
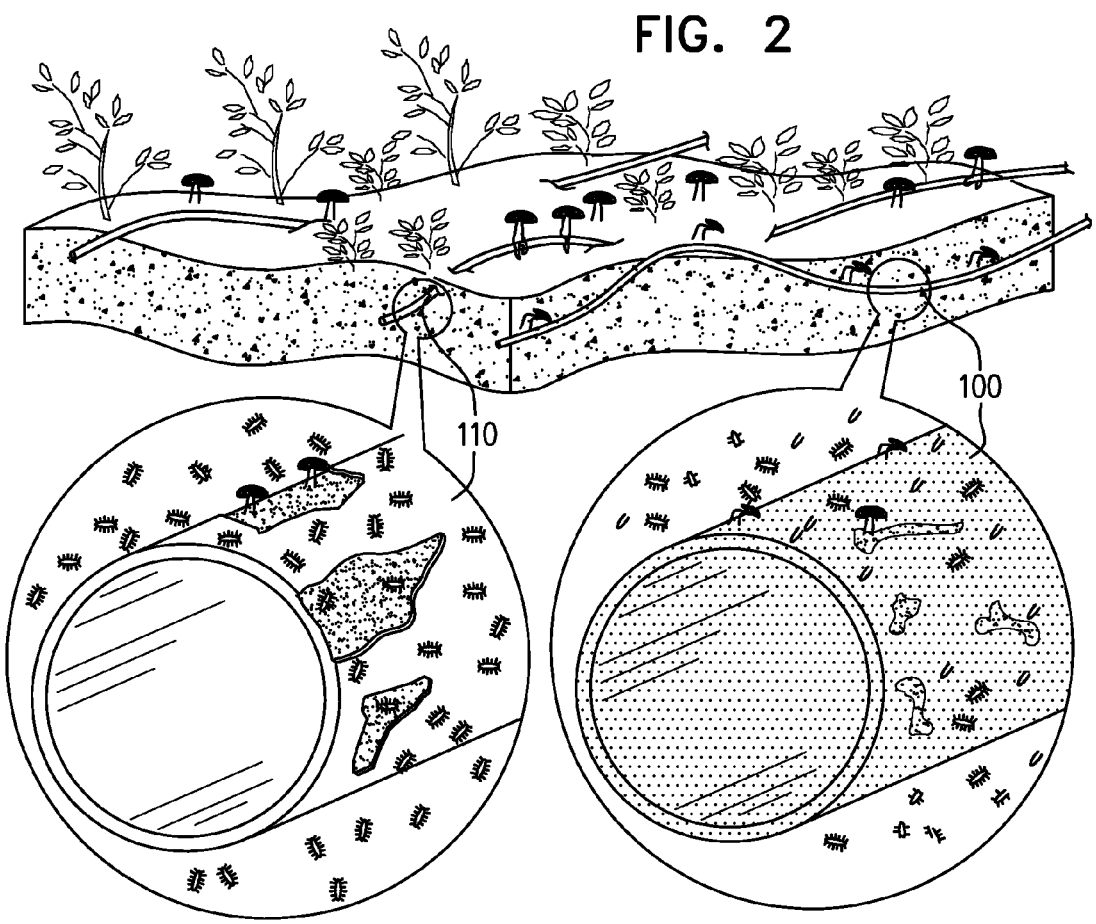
FIG. 2 is a simplified comparative illustration of the relative degradability characteristics of a biodegradable drip irrigation pipe and of the delayed degradability drip irrigation pipe, constructed and operative in accordance with a preferred embodiment of the present invention, illustrated in FIG. 1.

Reference is now made to FIG. 1, which is a simplified illustration of part of a delayed degradability drip irrigation pipe, constructed and operative in accordance with a preferred embodiment of the present invention, and to FIG. 2, which is a simplified comparative illustration of the relative degradability characteristics of a biodegradable drip irrigation pipe and of the delayed degradability drip irrigation pipe constructed and operative in accordance with the preferred embodiment of the present invention illustrated in FIG. 1.

FIG. 1 illustrates part of a delayed degradability drip irrigation pipe 100 which includes discrete emitter units 102 distributed along the length thereof in communication with the interior thereof. It is appreciated that the present invention is not limited in its applicability to this type of drip irrigation pipe and also applies to other types of drip irrigation pipes wherein the emitters are fully or partially defined by the pipe. The present invention applies to drip irrigation pipes which are formed by extrusion and equally to drip irrigation pipes that are formed by welding of elongate sheets.

The term "biodegradable" is used throughout to refer to degradation as the result of biological activity. When applied to irrigation pipes, it is not limited to pipes which do not leave any residue whatsoever in the ground.

The irrigation pipe 100 is preferably formed of a biodegradable plastic material, such as PBAT (polybutylene adipate/teraphthalate), PTMAT (polymethylene adipate/teraphthalate), naturally produced polyester, such as PHA polyesters (polyhydroxyalkanoates), PHBH polyesters (poly-hydroxybutyrate-co-polyhydroxy hexanoates) and PLA polyesters (polylactic acid), which is biodegradable by bacterial and/or fungal action.

In accordance with a preferred embodiment of the present invention delayed degradability functionality is provided by the addition of an active anti-bacterial and anti-fungal agent which demonstrates activity against a wide range of bacteria, mold and yeast, such as CIBA® IRGAGUARD® B-1000, B-5000 or B-7000, HYGATE® 4000 or 9000 and ALPHASAN®.

Preferably, the active anti-bacterial and anti-fungal agent is mixed with the biodegradable plastic material prior to formation of the pipe, for example, prior to extrusion of the pipe or of a sheet from which the pipe is formed. Alternatively, the active anti-bacterial and anti-fungal agent is co-extruded onto one or more surface of the pipe or sheet or coated thereon.

As seen in FIG. 1, the active anti-bacterial and anti-fungal agent may appear throughout the thickness of the pipe 100.

Turning to FIG. 2, degradable plastic drip irrigation pipes 100, which include an active anti-bacterial and anti-fungal agent, are shown alongside biodegradable plastic drip irrigation pipes 110, which do not include an active anti-bacterial and anti-fungal agent, at the same point in time.

It is seen that at a given point in time, typically six months following installation, biodegradable plastic drip irrigation pipes 110, which do not include an active anti-bacterial and anti-fungal agent, are in the process of biodegradation, typically under bacterial and fungal action. In contrast, in accordance with a preferred embodiment of the present invention, delayed degradability drip irrigation pipes 100, constructed and operative in accordance with a preferred embodiment of the present invention, include active anti-bacterial and anti-fungal agents, thereby delaying biodegradation under bacterial and fungal action, for a time duration, until such agents are no longer released or they become ineffective.

Figure 3:
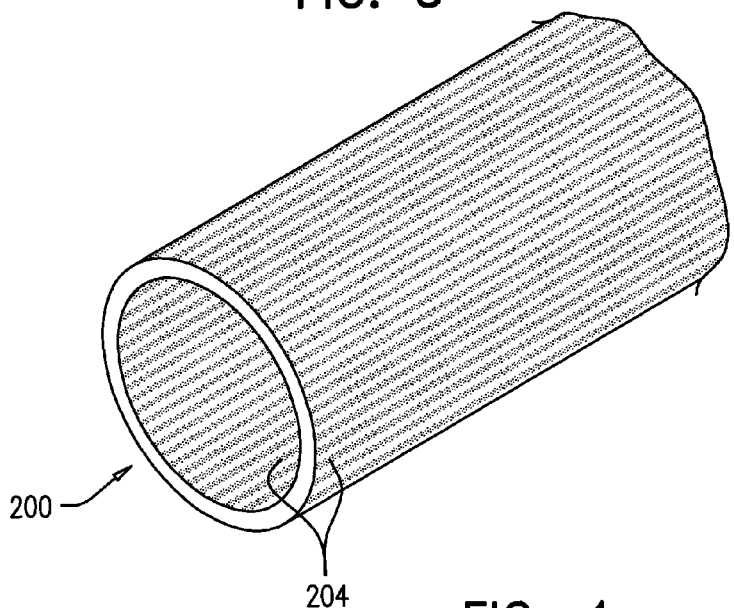
FIG. 3 is a simplified illustration of part of a delayed degradability drip irrigation pipe constructed and operative in accordance with another preferred embodiment of the present invention.
Figure 4:
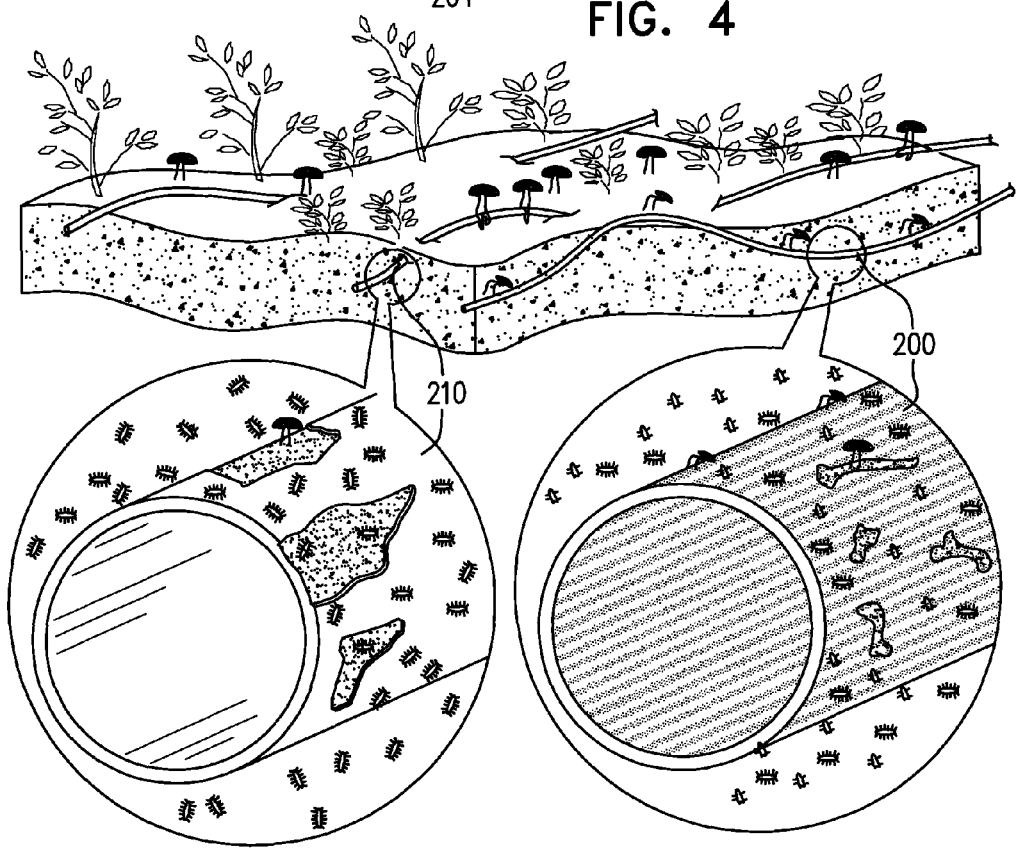
FIG. 4 is a simplified comparative illustration of the relative degradability characteristics of a biodegradable drip irrigation pipe and of the delayed degradability drip irrigation pipe, constructed and operative in accordance with another preferred embodiment of the present invention, illustrated in FIG. 3.

Reference is now made to FIG. 3, which is a simplified illustration of part of a delayed degradability drip irrigation pipe, constructed and operative in accordance with another preferred embodiment of the present invention, and to FIG. 4, which is a simplified comparative illustration of the relative degradability characteristics of a biodegradable drip irrigation pipe and of the delayed degradability drip irrigation pipe constructed and operative in accordance with the preferred embodiment of the present invention illustrated in FIG. 3.

FIG. 3 illustrates part of a delayed degradability drip irrigation pipe 200 which includes discrete emitter units (not shown) distributed along the length thereof in communication with the interior thereof. It is appreciated that the present invention is not limited in its applicability to this type of drip irrigation pipe and also applies to other types of drip irrigation pipes wherein the emitters are fully or partially defined by the pipe. The present invention applies to drip irrigation pipes which are formed by extrusion and equally to drip irrigation pipes that are formed by welding of elongate sheets.

The irrigation pipe 200 is preferably formed of a biodegradable plastic material, such as PBAT (polybutylene adipate/teraphthalate), PTMAT (polymethylene adipate/teraphthalate), naturally produced polyester, such as PHA polyesters (polyhydroxyalkanoates), PHBH polyesters (poly-hydroxybutyrate-co-polyhydroxy hexanoates) and PLA polyesters (polylactic acid), which is biodegradable by bacterial and/or fungal action.

In accordance with a preferred embodiment of the present invention, delayed degradability functionality is provided by provision of an active anti-bacterial and anti-fungal agent, which demonstrates activity against a wide range of bacteria, mold and yeast, such as CIBA® IRGAGUARD® B-1000, B-5000 or B-7000.

Preferably, the active anti-bacterial and anti-fungal agent is coextruded with the biodegradable plastic material during formation of the pipe or of a sheet from which the pipe is formed. Alternatively, the active anti-bacterial and anti-fungal agent is coated onto one or more surface of the pipe or sheet.

As seen in FIG. 3, the active anti-bacterial and anti-fungal agent may appear as strips 204 along the length of the pipe 200.

Turning to FIG. 4, biodegradable plastic drip irrigation pipes 200, which include an active anti-bacterial and anti-fungal agent, are shown alongside biodegradable plastic drip irrigation pipes 210, which do not include an active anti-bacterial and anti-fungal agent, at the same point in time.

It is seen that at a given point in time, typically six months following installation, biodegradable plastic drip irrigation pipes 210, which do not include an active anti-bacterial and anti-fungal agent, are in the process of biodegradation, typically under bacterial and fungal action. In contrast, in accordance with a preferred embodiment of the present invention, delayed degradability drip irrigation pipes 200, constructed and operative in accordance with a preferred embodiment of the present invention, include active anti-bacterial and anti-fungal agents, thereby delaying biodegradation under bacterial and fungal action, for a time duration, until either such agents are no longer released or they become ineffective.

Figure 5:
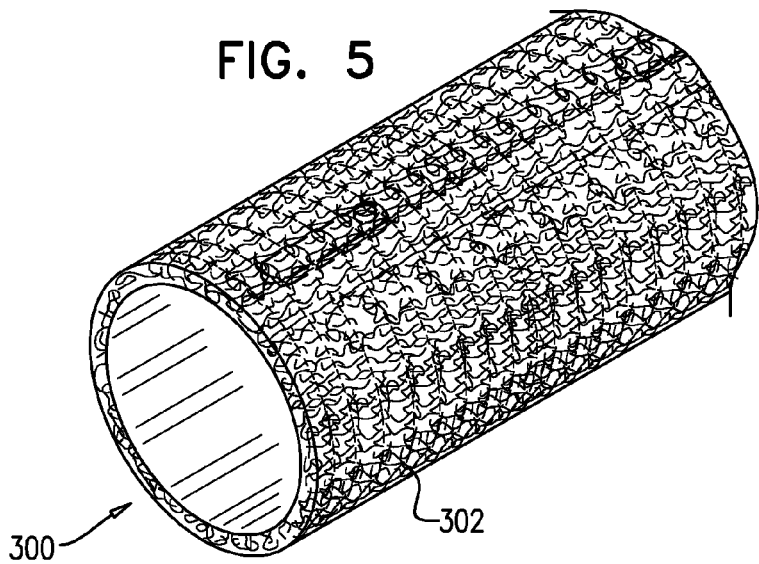
FIG. 5 is a simplified illustration of part of a delayed degradability drip irrigation pipe constructed and operative in accordance with a further preferred embodiment of the present invention.
Figure 6:
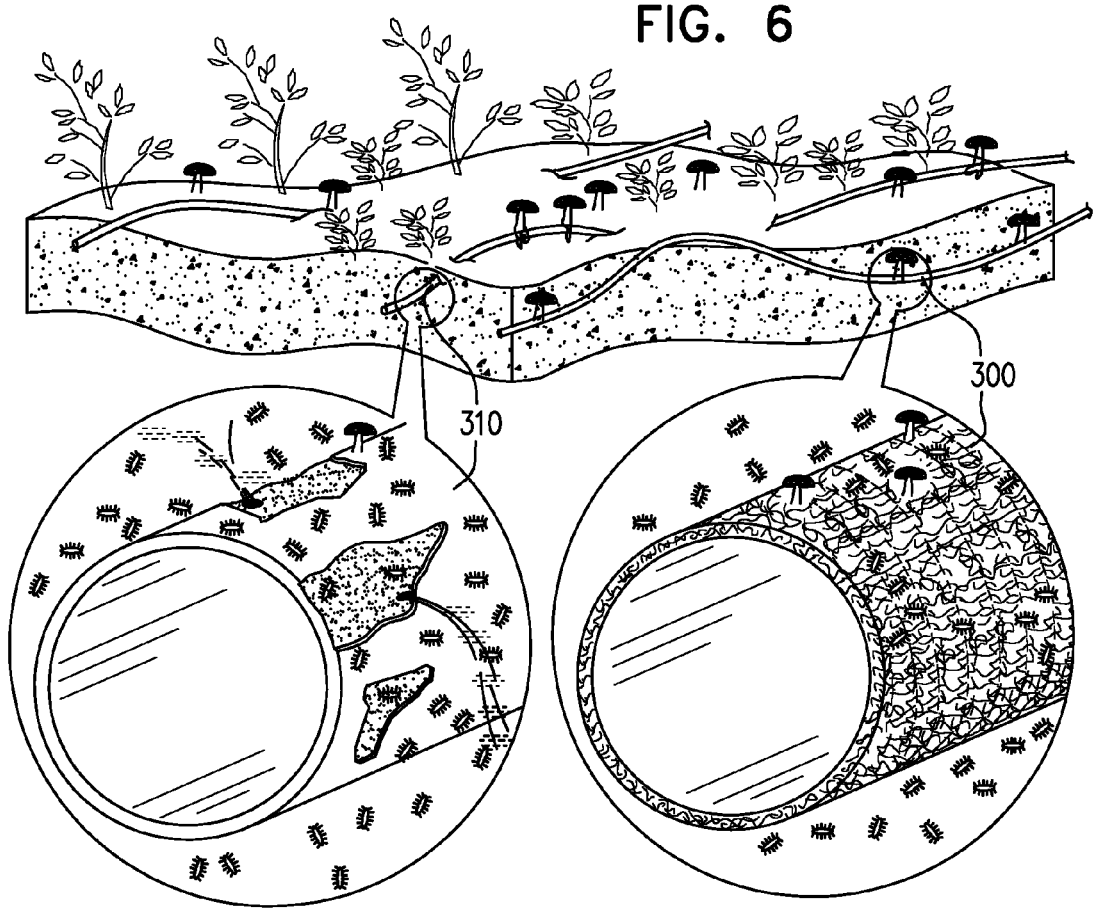
FIG. 6 is a simplified comparative illustration of the relative degradability characteristics of a biodegradable drip irrigation pipe and of the delayed degradability drip irrigation pipe, constructed and operative in accordance with a further preferred embodiment of the present invention, illustrated in FIG. 5.

Reference is now made to FIG. 5, which is a simplified illustration of part of a delayed degradability drip irrigation pipe, constructed and operative in accordance with yet another preferred embodiment of the present invention, and to FIG. 6, which is a simplified comparative illustration of the relative degradability characteristics of a biodegradable drip irrigation pipe and of the delayed degradability drip irrigation pipe constructed and operative in accordance with the embodiment of the present invention illustrated in FIG. 5.

FIG. 5 illustrates part of a delayed degradability drip irrigation pipe 300 which includes discrete emitter units (not shown) distributed along the length thereof in communication with the interior thereof. It is appreciated that the present invention is not limited in its applicability to this type of drip irrigation pipe and also applies to other types of drip irrigation pipes wherein the emitters are fully or partially defined by the pipe. The present invention applies to drip irrigation pipes which are formed by extrusion and equally to drip irrigation pipes that are formed by welding of elongate sheets.

The irrigation pipe 300 is preferably formed of a biodegradable plastic material, such as PBAT (polybutylene adipate/teraphthalate), PTMAT (polymethylene adipate/teraphthalate), naturally produced polyester, such as PHA polyesters (polyhydroxyalkanoates), PHBH polyesters (poly-hydroxybutyrate-co-polyhydroxy hexanoates) and PLA polyesters (polylactic acid), which is biodegradable by bacterial and/or fungal action.

In accordance with a preferred embodiment of the present invention, delayed degradability functionality is provided by the addition of a generally non-biodegradable material, such as polyethylene, to the biodegradable plastic material.

Additionally, in accordance with a preferred embodiment of the present invention, delayed degradability functionality may be enhanced by the addition of an active anti-bacterial and anti-fungal agent which demonstrates activity against a wide range of bacteria, mold and yeast, such as CIBA® IRGAGUARD® B-1000, B-5000 or B-7000, HYGATE® 4000 or 9000 and ALPHASAN®. Preferably, the active anti-bacterial and anti-fungal agent is mixed with the biodegradable plastic material prior to formation of the pipe, for example, prior to extrusion of the pipe or of a sheet from which the pipe is formed.

Preferably, the generally non-biodegradable material is mixed with the biodegradable plastic material prior to formation of the pipe, for example, prior to extrusion of the pipe or of a sheet from which the pipe is formed. The resulting pipe or sheet includes relatively long linked plastic molecules which define a net or screen type structure 302, which resists and delays degradation, such as failure due to bursting of the drip irrigation pipe 300, notwithstanding early stage biodegradation of the biodegradable plastic material thereof.

As seen in FIG. 5, the generally non-biodegradable material preferably is distributed generally throughout the thickness of the pipe 300.

Turning to FIG. 6, biodegradable plastic drip irrigation pipes 300, which include an internal net or screen type structure 302 formed of a generally non-biodegradable material, are shown alongside biodegradable plastic drip irrigation pipes 310, which do not include an internal net or screen type structure formed of a generally non-biodegradable material, at the same point in time.

It is seen that at a given point in time, typically six months following installation, biodegradable plastic drip irrigation pipes 310, which do not include an internal net or screen type structure formed of a generally non-biodegradable material, are in the process of biodegradation, typically under bacterial and fungal action. In contrast, in accordance with a preferred embodiment of the present invention, delayed degradability drip irrigation pipes 300, constructed and operative in accordance with a preferred embodiment of the present invention, are mechanically strengthened against bursting by net or screen type structure 302, thereby delaying degradation under bacterial and fungal action for a desired time duration.

Figure 7:
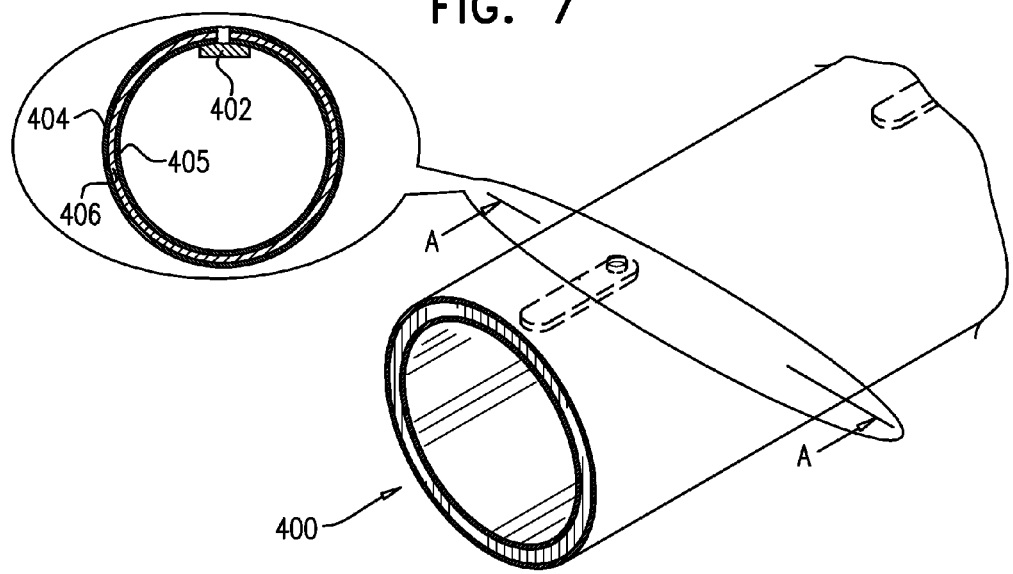
FIG. 7 is a simplified illustration of part of a delayed degradability drip irrigation pipe constructed and operative in accordance with yet another preferred embodiment of the present invention.
Figure 8:
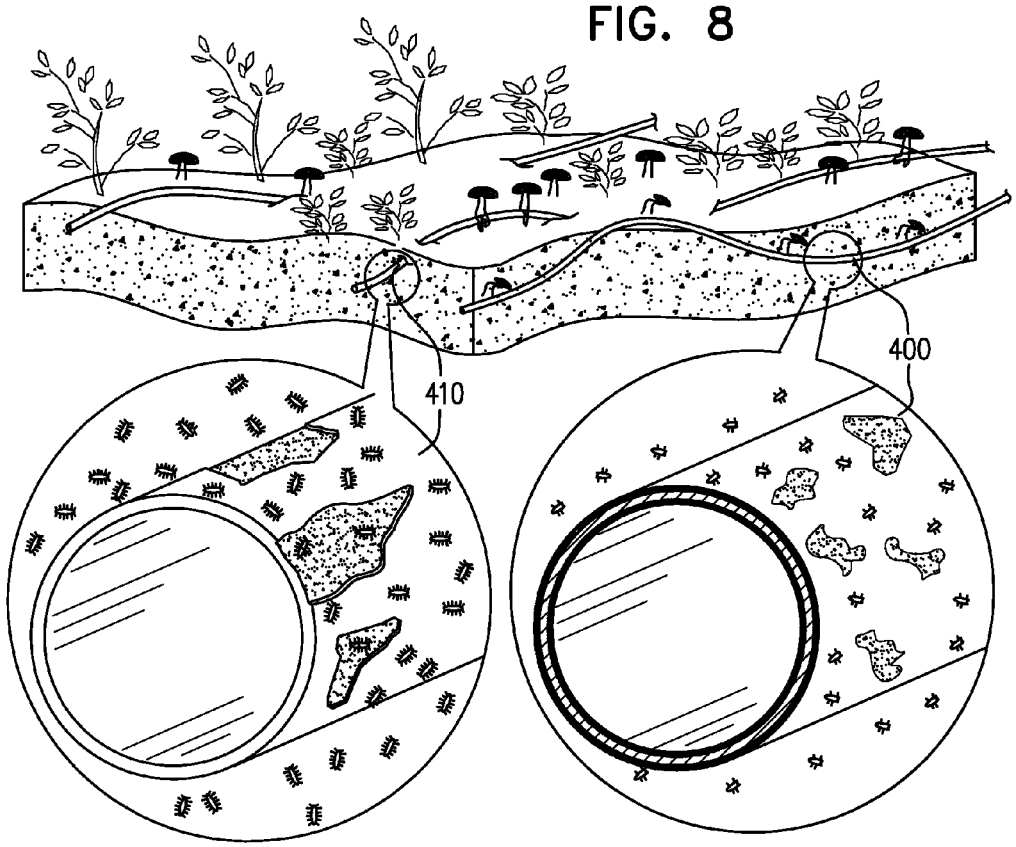
FIG. 8 is a simplified comparative illustration of the relative degradability characteristics of a biodegradable drip irrigation pipe and of the delayed degradability drip irrigation pipe, constructed and operative in accordance with yet another preferred embodiment of the present invention, illustrated in FIG. 7.

Reference is now made to FIG. 7, which is a simplified illustration of part of a delayed degradability drip irrigation pipe, constructed and operative in accordance with still another preferred embodiment of the present invention, and to FIG. 8, which is a simplified comparative illustration of the relative degradability characteristics of a biodegradable drip irrigation pipe and of the delayed degradability drip irrigation pipe constructed and operative in accordance with the preferred embodiment of the present invention illustrated in FIG. 7.

FIG. 7 illustrates part of a delayed degradability drip irrigation pipe 400 which includes discrete emitter units 402 distributed along the length thereof in communication with the interior thereof. It is appreciated that the present invention is not limited in its applicability to this type of drip irrigation pipe and also applies to other types of drip irrigation pipes wherein the emitters are fully or partially defined by the pipe. The present invention applies to drip irrigation pipes which are formed by extrusion and equally to drip irrigation pipes that are formed by welding of elongate sheets.

The irrigation pipe 400 is preferably formed of a biodegradable plastic material, such as PBAT (polybutylene adipate/teraphthalate), PTMAT (polymethylene adipate/teraphthalate), naturally produced polyester such as PHA polyesters (polyhydroxyalkanoates), PHBH polyesters (poly-hydroxybutyrate-co-polyhydroxy hexanoates) and PLA polyesters (polylactic acid), which is biodegradable by bacterial and/or fungal action.

In accordance with a preferred embodiment of the present invention, delayed degradability functionality is provided by the addition of an active anti-bacterial and anti-fungal agent, which demonstrates activity against a wide range of bacteria, mold and yeast, such as CIBA® IRGAGUARD® B-1000, B-5000 or B-7000, HYGATE® 4000 or 9000 and ALPHASAN®, to at least one of, and preferably all of, an outer coextruded biodegradable plastic layer 404, an innermost coextruded biodegradable plastic layer 405 and a middle biodegradable plastic layer 406 of pipe 400.

Preferably, the active anti-bacterial and anti-fungal agent is mixed with the biodegradable plastic material used to form layer 404, layer 405 and/or layer 406, prior to coextrusion of the pipe or of a sheet from which the pipe is formed.

As seen in FIG. 7, the active anti-bacterial and anti-fungal agent may appear throughout the thickness of the outer layer 404, innermost layer 405 and/or middle layer 406 of pipe 400. It is appreciated that the active anti-bacterial and anti-fungal agents included in outer layer 404, innermost layer 405 and middle layer 406 may be the same for each layer or may be different for each layer to provide different time delays for the delayed degradability functionality of delayed degradability drip irrigation pipe 400.

Turning to FIG. 8, biodegradable plastic drip irrigation pipes 400, in which at least one of outer layer 404, innermost layer 405 and/or middle layer 406 include an active anti-bacterial and anti-fungal agent, are shown alongside biodegradable plastic drip irrigation pipes 410, which do not include an active anti-bacterial and anti-fungal agent, at the same point in time.

It is seen that at a given point in time, typically six months following installation, biodegradable plastic drip irrigation pipes 410, which do not include at least one layer including an active anti-bacterial and anti-fungal agent, are in the process of biodegradation, typically under bacterial and fungal action. In contrast, in accordance with a preferred embodiment of the present invention, delayed degradability drip irrigation pipes 400, constructed and operative in accordance with the preferred embodiment of the present invention of FIG. 7 include active anti-bacterial and anti-fungal agents, thereby delaying biodegradation under bacterial and fungal action for a time duration until either such agents are no longer released or they become ineffective.

It is appreciated that, although in the illustrated embodiment shown in FIG. 7, pipes 400 include three layers 404, 405 and 406, in accordance with the present invention pipes 400 may include any number of layers, including two or more layers, of which at least one layer includes active anti-bacterial and anti-fungal agents. In a most preferred embodiment of the present invention, at least the outermost layer of pipes 400 includes active anti-bacterial and anti-fungal agents.

Figure 9:
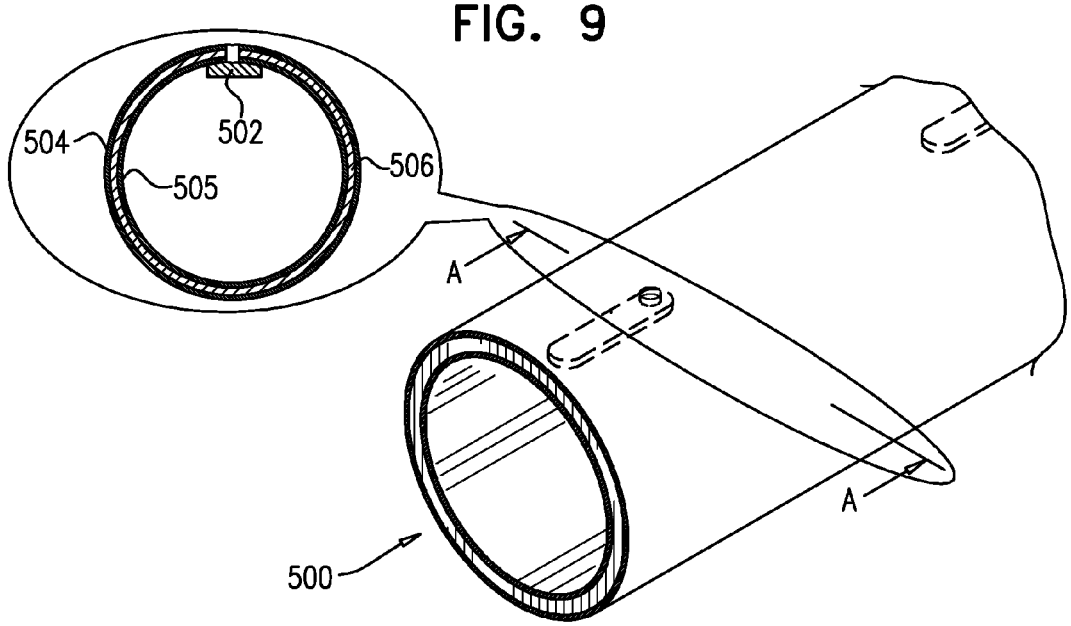
FIG. 9 is a simplified illustration of part of a delayed degradability drip irrigation pipe constructed and operative in accordance with still another preferred embodiment of the present invention.
Figure 10:
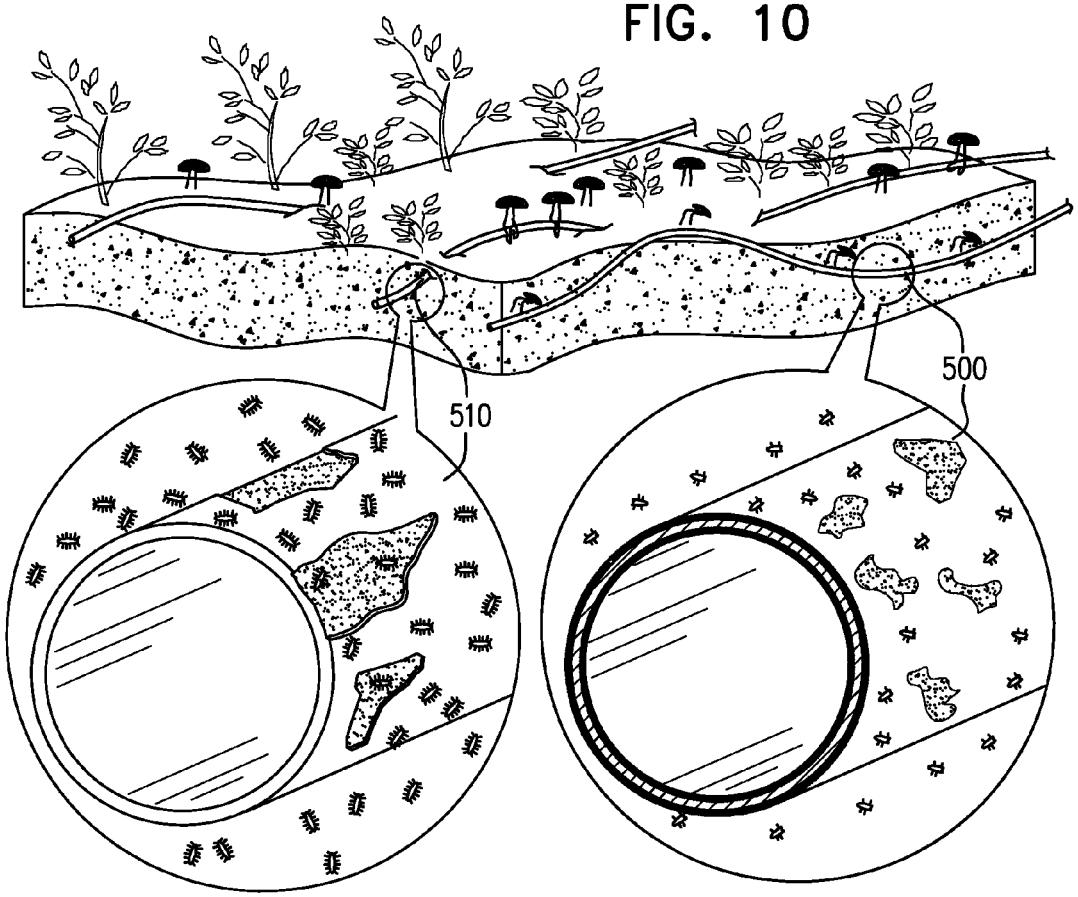
FIG. 10 is a simplified comparative illustration of the relative degradability characteristics of a biodegradable drip irrigation pipe and of the delayed degradability drip irrigation pipe, constructed and operative in accordance with yet another preferred embodiment of the present invention, illustrated in FIG. 9.

Reference is now made to FIG. 9, which is a simplified illustration of part of a delayed degradability drip irrigation pipe, constructed and operative in accordance with still another preferred embodiment of the present invention, and to FIG. 10, which is a simplified comparative illustration of the relative degradability characteristics of a biodegradable drip irrigation pipe and of the delayed degradability drip irrigation pipe constructed and operative in accordance with the preferred embodiment of the present invention illustrated in FIG. 9.

FIG. 9 illustrates part of a delayed degradability drip irrigation pipe 500 which includes discrete emitter units 502 distributed along the length thereof in communication with the interior thereof. It is appreciated that the present invention is not limited in its applicability to this type of drip irrigation pipe and also applies to other types of drip irrigation pipes wherein the emitters are fully or partially defined by the pipe. The present invention applies to drip irrigation pipes which are formed by extrusion and equally to drip irrigation pipes that are formed by welding of elongate sheets.

The irrigation pipe 500 is preferably formed of a biodegradable plastic material, such as PBAT (polybutylene adipate/teraphthalate), PTMAT (polymethylene adipate/teraphthalate), naturally produced polyester such as PHA polyesters (polyhydroxyalkanoates), PHBH polyesters (poly-hydroxybutyrate-co-polyhydroxy hexanoates) and PLA polyesters (polylactic acid), which is biodegradable by bacterial and/or fungal action.

In accordance with a preferred embodiment of the present invention, delayed degradability functionality is provided by the addition of at least one of an outer coextruded biodegradable plastic layer 504 and an innermost coextruded biodegradable plastic layer 505, containing an active anti-bacterial and anti-fungal agent which demonstrates activity against a wide range of bacteria, mold and yeast, such as CIBA® IRGAGUARD® B-1000, B-5000 or B-7000, HYGATE® 4000 or 9000 and ALPHASAN®.

Preferably, the active anti-bacterial and anti-fungal agent is mixed with the biodegradable plastic material used to form layer 504 and/or layer 505, prior to coextrusion of the pipe or of a sheet from which the pipe is formed.

It is appreciated that the active anti-bacterial and anti-fungal agent may appear throughout the thickness of the outer layer 504 and/or innermost layer 505 of pipe 500.

Turning to FIG. 10, biodegradable plastic drip irrigation pipes 500, which include a coextruded outer layer 504 and/or inner layer 505, including an active anti-bacterial and anti-fungal agent, are shown alongside biodegradable plastic drip irrigation pipes 510, which do not include an active anti-bacterial and anti-fungal agent, at the same point in time.

It is seen that at a given point in time, typically six months following installation, biodegradable plastic drip irrigation pipes 510, which do not include a coextruded outer layer including an active anti-bacterial and anti-fungal agent, are in the process of biodegradation, typically under bacterial and fungal action. In contrast, in accordance with a preferred embodiment of the present invention, delayed degradability drip irrigation pipes 500, constructed and operative in accordance with the preferred embodiment of the present invention of FIG. 9 include active anti-bacterial and anti-fungal agents, thereby delaying biodegradation under bacterial and fungal action for a time duration until either such agents are no longer released or they become ineffective.

Figure 11:
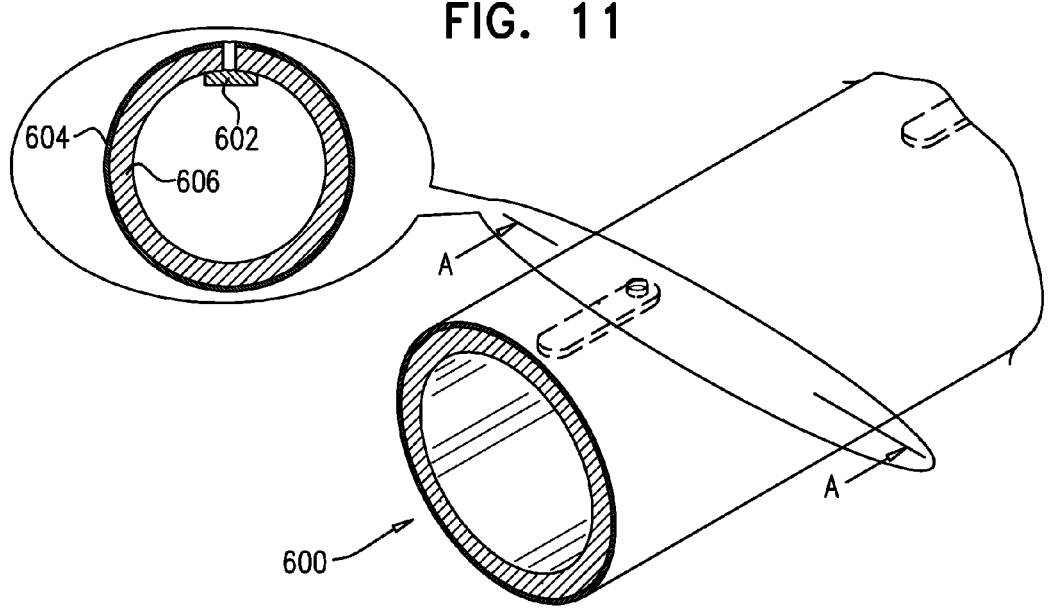
FIG. 11 is a simplified illustration of part of a delayed degradability drip irrigation pipe constructed and operative in accordance with still a further another preferred embodiment of the present invention.
Figure 12:
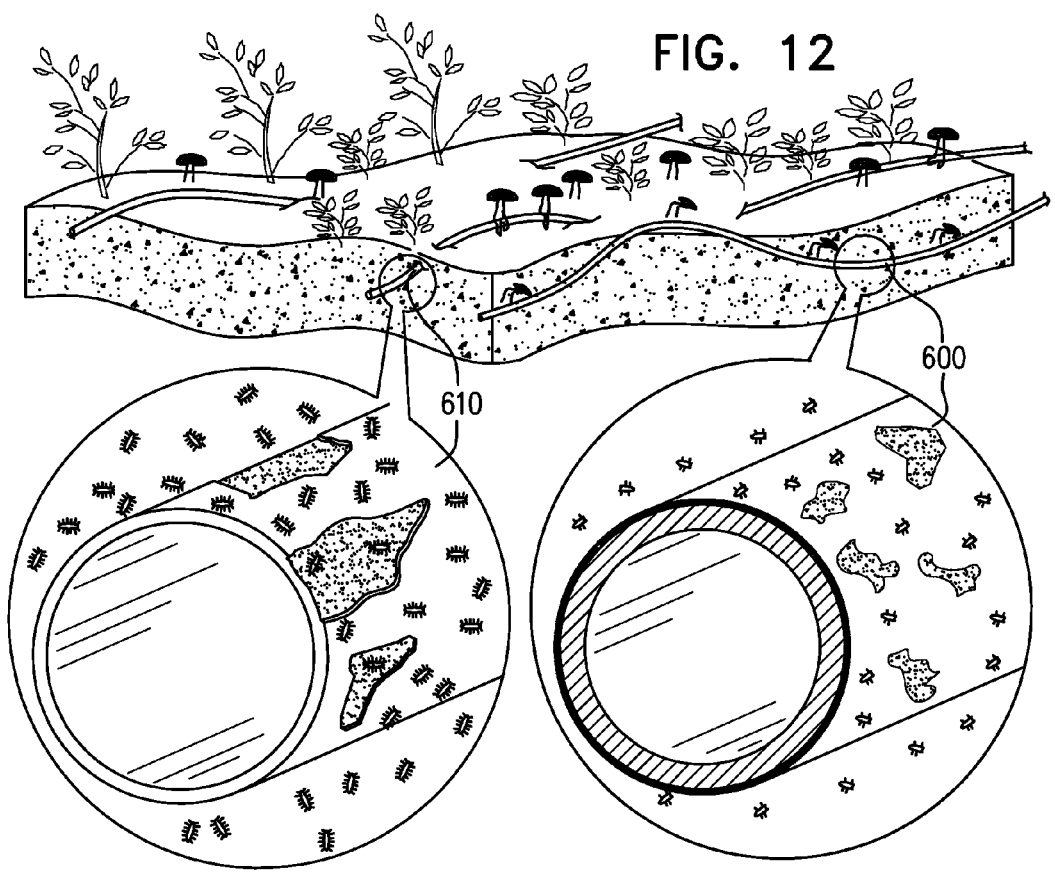
FIG. 12 is a simplified comparative illustration of the relative degradability characteristics of a biodegradable drip irrigation pipe and of the delayed degradability drip irrigation pipe, constructed and operative in accordance with yet another preferred embodiment of the present invention, illustrated in FIG. 11.

Reference is now made to FIG. 11, which is a simplified illustration of part of a delayed degradability drip irrigation pipe, constructed and operative in accordance with still a further preferred embodiment of the present invention, and to FIG. 12, which is a simplified comparative illustration of the relative degradability characteristics of a biodegradable drip irrigation pipe and of the delayed degradability drip irrigation pipe constructed and operative in accordance with the preferred embodiment of the present invention illustrated in FIG. 11.

FIG. 11 illustrates part of a delayed degradability drip irrigation pipe 600 which includes discrete emitter units 602 distributed along the length thereof in communication with the interior thereof. It is appreciated that the present invention is not limited in its applicability to this type of drip irrigation pipe and also applies to other types of drip irrigation pipes wherein the emitters are fully or partially defined by the pipe. The present invention applies to drip irrigation pipes which are formed by extrusion and equally to drip irrigation pipes that are formed by welding of elongate sheets.

The irrigation pipe 600 is preferably formed with an outer layer 604 of a biodegradable plastic material, such as PBAT (polybutylene adipate/teraphthalate), PTMAT (polymethylene adipate/teraphthalate), naturally produced polyester such as PHA polyesters (polyhydroxyalkanoates), PHBH polyesters (poly-hydroxybutyrate-co-polyhydroxy hexanoates) and PLA polyesters (polylactic acid), which is biodegradable by bacterial and/or fungal action.

In accordance with a preferred embodiment of the present invention, delayed degradability functionality is provided by the addition to the outer layer 604 of an active anti-bacterial and anti-fungal agent which demonstrates activity against a wide range of bacteria, mold and yeast, such as CIBA® IRGAGUARD® B-1000, B-5000 or B-7000, HYGATE® 4000 or 9000 and ALPHASAN®.

In accordance with a preferred embodiment of the present invention, additional delayed degradability functionality is provided by the provision of an inner layer 606 formed of a plastic material which is not-biodegradable but is degradable in response to exposure to another degradability initiator, such as UV. A suitable UV degradable plastic material is polyethylene. Layers 604 and 606 are preferably co-extruded.

Additionally, inner layer 406 may also include an oxo-biodegradable material, such as EPIcor™ 2058, commercially available from EPI Environmental Products, Inc., of Vancouver, B.C., Canada, which enhances breakdown of inner layer 606.

Preferably, the active anti-bacterial and anti-fungal agent is mixed with the biodegradable plastic material used to form layer 604, prior to co-extrusion of the pipe or of a sheet from which the pipe is formed.

It is appreciated that the active anti-bacterial and anti-fungal agent may appear throughout the thickness of the outer layer 604.

Turning to FIG. 12, biodegradable plastic drip irrigation pipes 600, which include a coextruded outer layer 604 and inner layer 606 as described hereinabove, are shown alongside biodegradable plastic drip irrigation pipes 610, which do not include an active anti-bacterial and anti-fungal agent, at the same point in time.

It is seen that at a given point in time, typically six months following installation, biodegradable plastic drip irrigation pipes 610, which do not include a coextruded outer layer including an active anti-bacterial and anti-fungal agent, are in the process of biodegradation, typically under bacterial and fungal action. In contrast, in accordance with a preferred embodiment of the present invention, delayed degradability drip irrigation pipes 600, constructed and operative in accordance with the preferred embodiment of the present invention of FIG. 11, remain intact and functional for a predetermined, desired duration.

It will be appreciated by persons skilled in the art that the present invention is not limited by what has been particularly shown and described hereinabove. Rather, the scope of the present invention includes combinations and subcombinations of the features described above as well as modifications and variations which would occur to persons skilled in the art upon reading the foregoing description and which are not in the prior art.

The invention claimed is:

1. A delayed degradability drip irrigation pipe including:
   a water conduit at a water conduit pressure; and
   a plurality of drip irrigation outlets, each communicating with said water conduit and providing a water output at a pressure below said water conduit pressure, said water conduit comprising:
   at least one first layer formed of a biodegradable material, said biodegradable material being mixed with a biodegradability delayer which provides a desired delay prior to failure of the water conduit but permits eventual degradation of said biodegradable material under predetermined conditions; and
   at least one second layer formed of a non-biodegradable, UV degradable material.

2. A delayed degradability drip irrigation pipe according to claim 1 and wherein said biodegradability delayer comprises a bacterial growth delayer.

3. A delayed degradability drip irrigation pipe according to claim 1 and wherein said biodegradability delayer comprises a generally non-biodegradable material which is mixed with said biodegradable material.

4. A delayed degradability drip irrigation pipe according to claim 1 and wherein said at least one second layer also includes an oxo-biodegradable material.

* * * * *